(No Model.)

J. W. KA VEAR & C. E. GIBBS.
NUT LOCK.

No. 588,338. Patented Aug. 17, 1897.

Witnesses:
James F. Duhamel
J. G. Tabler

Inventors:
Charles E. Gibbs
John W. Ka Vear
by John Wedderburn
Attorney

UNITED STATES PATENT OFFICE.

JOHN W. KA VEAR AND CHARLES E. GIBBS, OF NORTH DECATUR, GEORGIA.

NUT-LOCK.

SPECIFICATION forming part of Letters Patent No. 588,338, dated August 17, 1897.

Application filed July 8, 1896. Serial No. 598,454. (No model.)

*To all whom it may concern:*

Be it known that we, JOHN W. KA VEAR and CHARLES E. GIBBS, citizens of the United States, residing at North Decatur, in the county of De Kalb and State of Georgia, have invented certain new and useful Improvements in Nut-Locks; and we do hereby declare the following to be a full, clear, and exact description of the invention, such as will enable others skilled in the art to which it appertains to make and use the same.

Our invention relates to certain new and useful improvements in nut and bolt locks, the object of the same being to provide a simple, cheap, and effective device for holding in place nuts upon the ends of bolts for securing fish-plates to rails.

The invention consists of a bolt of ordinary construction, a locking-plate located upon the outside of the fish-plate having one or more angularly-arranged slots therein with parallel sides and open at their lower ends, and a nut having a rectangular shoulder or extension on its inner surface, the said nut adapted to screw upon said bolt with the shoulder or extension thereon projecting through the slot in said locking-plate.

The invention also consists in other details of construction and combinations of parts, which will be hereinafter more fully described and claimed.

Figure 1:
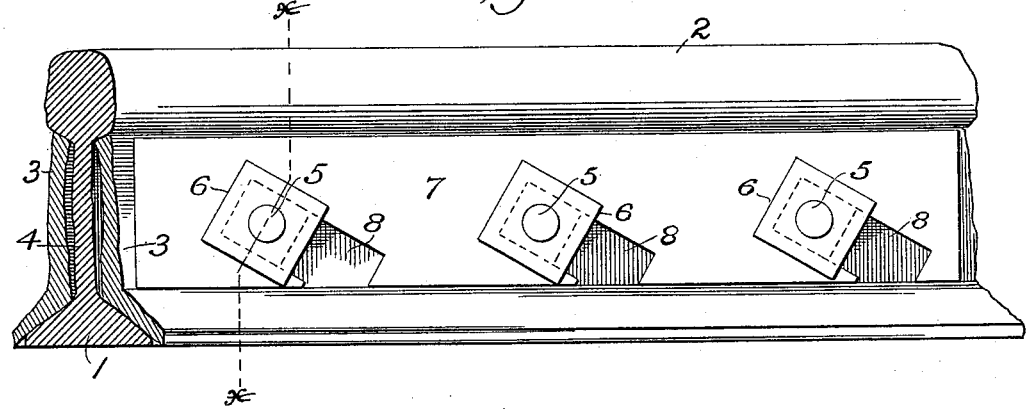
Figure 2:
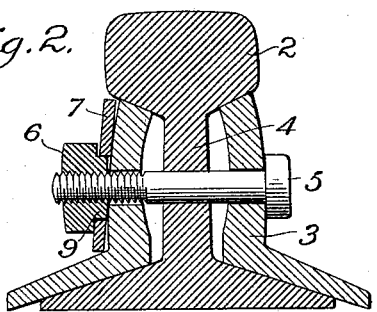
Figure 3:
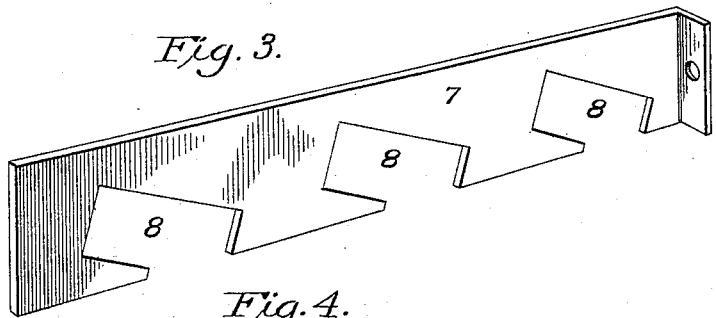
Figure 4:
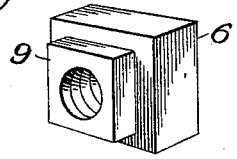

In the drawings forming part of this specification, Figure 1 represents a side elevation of a section of rail, showing our nut-lock applied thereto. Fig. 2 is a vertical section on the line $x\,x$ of Fig. 1. Fig. 3 is a detail perspective view of the locking-plate. Fig. 4 is a detail perspective view of one of the nuts.

Like reference-numerals indicate like parts in the different views.

Our improved nut-lock is especially designed for the purpose of preventing the disengagement of nuts employed upon bolts for securing fish-plates in place and has been so illustrated in the drawings accompanying this specification. It is obvious, however, that it may be applied to use wherever it is a desideratum to prevent nuts from becoming disengaged from bolts. The rail 1 is of the ordinary form of construction, having a T-head 2, and fish-plates 3 3, attached to the sides of the webs 4 thereof. Passing through the fish-plates 3 and the web 4 are bolts 5 5, having the locking-nuts 6 6 upon their outer ends. Between the nuts 6 and the outer fish-plate 3 is a locking-plate 7, having a series of slots 8 8 therein, which are angularly arranged and provided with parallel sides and are open at their lower ends. This plate is, as stated, adapted to rest against the side of the fish-plate 3. The nuts 6 6 are of the usual size, but are formed with rectangular shoulders or extensions 9 upon their inner surfaces, the said shoulders being slightly thicker than the locking-plate 7, adapted to fit within the slots 8 in said locking-plate and formed without screw-threads.

In applying our device the nuts 6 are seated in place on the bolts 5, and the locking-plate 7 is then passed downwardly along the side of the fish-plate 3 with the slots 8 therein embracing the rectangular shoulders or extensions 9 on the nuts 6. When thus in place, it is absolutely impossible for the nuts 6 to become detached from the ends of the bolts 5, as the turning of the same is prevented by the engagement of the sides of the shoulders 9 with the sides of the slots 8.

Having now described our invention, what we claim as new, and desire to secure by Letters Patent, is—

1. In a nut-lock, the combination with a bolt, of a nut thereon having a rectangular shoulder or extension thereon, and a locking-plate having a diagonally-arranged slot therein adapted to be passed around the rectangular extension on said nut.

2. In a nut-lock, the combination with a bolt, of a nut thereon having a rectangular shoulder or extension upon one side thereof, and a locking-plate having a diagonally-arranged slot therein with parallel sides and an open lower end adapted to be passed around the extension on said nut, substantially as and for the purpose described.

3. The combination with a rail and a fish-plate, of a plurality of bolts for securing the fish-plate to said rail, nuts upon said bolts having rectangular shoulders or extensions upon their inner surfaces, and a locking-plate having a series of diagonally-arranged slots therein, having parallel sides and open at their lower ends, the said plate adapted to be inserted between the inner surface of the main part of said nut and the outer surface of said fish-plate, with the slots therein embracing the rectangular extensions on said nuts and the upper edges of said plate engaging the under side of the head of the rail, substantially as and for the purpose described.

4. The combination with a rail and a fish-plate, of a plurality of bolts for securing the fish-plate to said rail, nuts upon said bolts having rectangular shoulders or extensions upon their inner surfaces, and a locking-plate having a series of diagonally-arranged slots therein, having parallel sides and open at their lower ends, the said plate adapted to be inserted between the inner surface of the main part of said nut and the outer surface of said fish-plate, with the slots therein embracing the rectangular extensions on said nuts and the upper edges of said plate engaging the under side of the head of the rail, the said extensions being thicker than said locking-plate, substantially as and for the purpose described.

In testimony whereof we have signed this specification in the presence of two subscribing witnesses.

JOHN W. KA VEAR.
CHARLES E. GIBBS.

Witnesses:
B. F. BURGESS,
JOSEPH DAWSON ANSELL.